United States Patent
Murao et al.

(10) Patent No.: US 8,493,031 B2
(45) Date of Patent: Jul. 23, 2013

(54) EQUALIZATION DEVICE, BATTERY SYSTEM AND ELECTRIC VEHICLE INCLUDING THE SAME, EQUALIZATION PROCESSING PROGRAM, AND EQUALIZATION PROCESSING METHOD

(75) Inventors: Hiroya Murao, Hirakata (JP); Yutaka Yamauchi, Himeji (JP); Shigeto Tamezane, Kakogawa (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 427 days.

(21) Appl. No.: 12/956,806

(22) Filed: Nov. 30, 2010

(65) Prior Publication Data

US 2011/0127962 A1    Jun. 2, 2011

(30) Foreign Application Priority Data

Nov. 30, 2009 (JP) ................................ 2009-271732

(51) Int. Cl.
*H02J 7/00* (2006.01)
*H02J 7/04* (2006.01)

(52) U.S. Cl.
USPC ..................... 320/132; 320/156; 320/161

(58) Field of Classification Search
USPC ..................... 320/132, 151, 156, 161
See application file for complete search history.

(56) References Cited

U.S. PATENT DOCUMENTS

| 8,022,674 B2* | 9/2011 | Miura ........................... 320/132 |
| 2008/0238371 A1 | 10/2008 | Tamezane | |
| 2009/0243548 A1* | 10/2009 | Hoff ............................... 320/150 |

FOREIGN PATENT DOCUMENTS

| JP | 11-299122 A | 10/1999 |
| JP | 2000-092733 A | 3/2000 |
| JP | 2003-284253 A | 10/2003 |
| JP | 2008-241358 A | 10/2008 |
| WO | 2009/113530 A1 | 9/2009 |

OTHER PUBLICATIONS

English Abstract for JP 2008-241358 A, published Oct. 9, 2008.

* cited by examiner

*Primary Examiner* — Richard V Muralidar
(74) *Attorney, Agent, or Firm* — NDQ&M Watchstone LLP

(57) ABSTRACT

An SOC of each battery cell is periodically detected, and an SOCmin and an SOCmax are determined. Battery cells having the SOCs larger than SOCmin+α are selectively discharged. After an elapse of a preset equalization processing time period, discharge of all the battery cells is stopped. The equalization processing time period is set based on a rate of change in the SOC of the battery cell subjected to discharge and a rate of change in the SOC of the battery cell not subjected to discharge such that a magnitude relationship between the SOC of the battery cell having the SOCmin and the SOC of another battery cell is not reversed.

11 Claims, 9 Drawing Sheets

F I G. 1
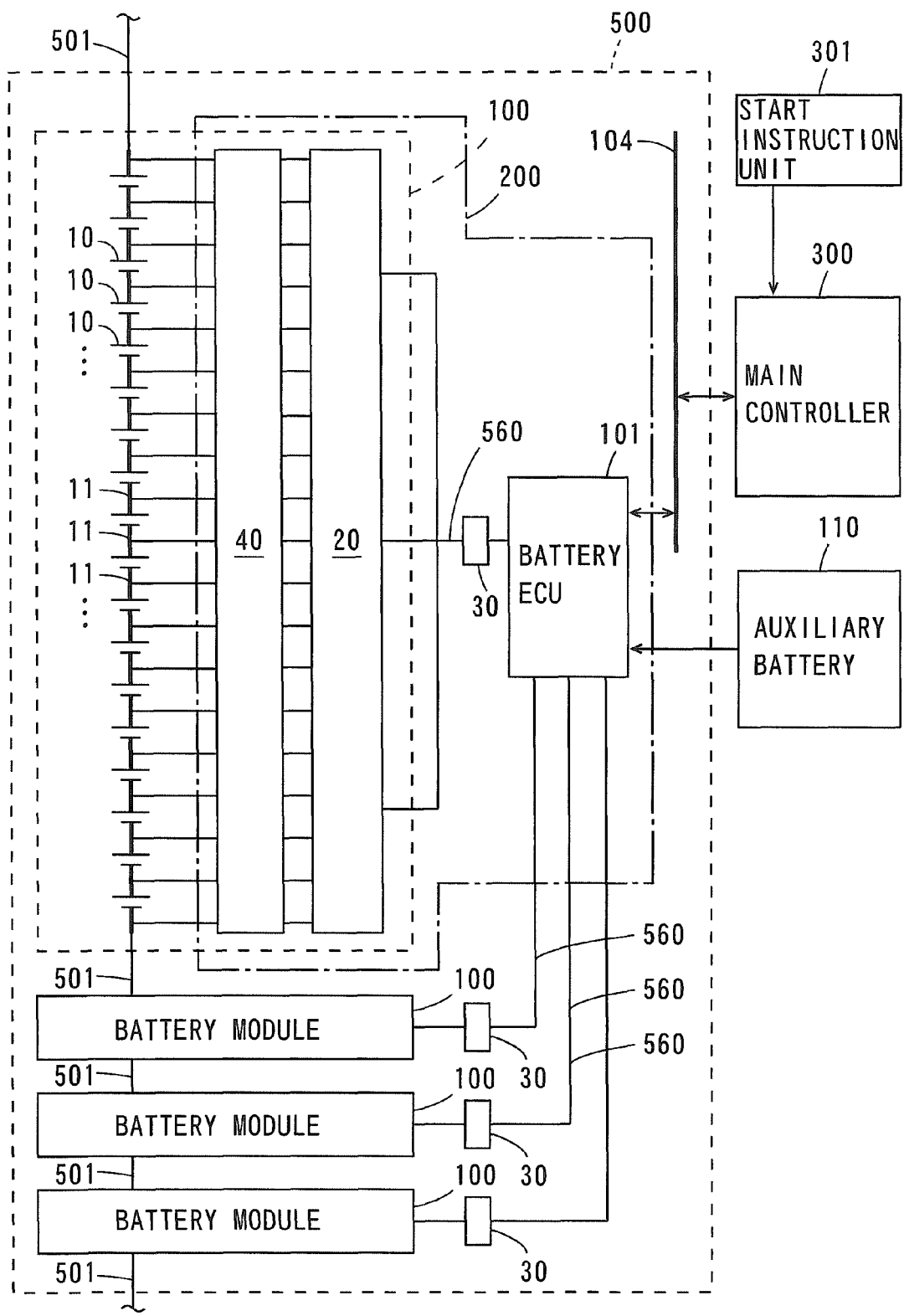

F I G. 4
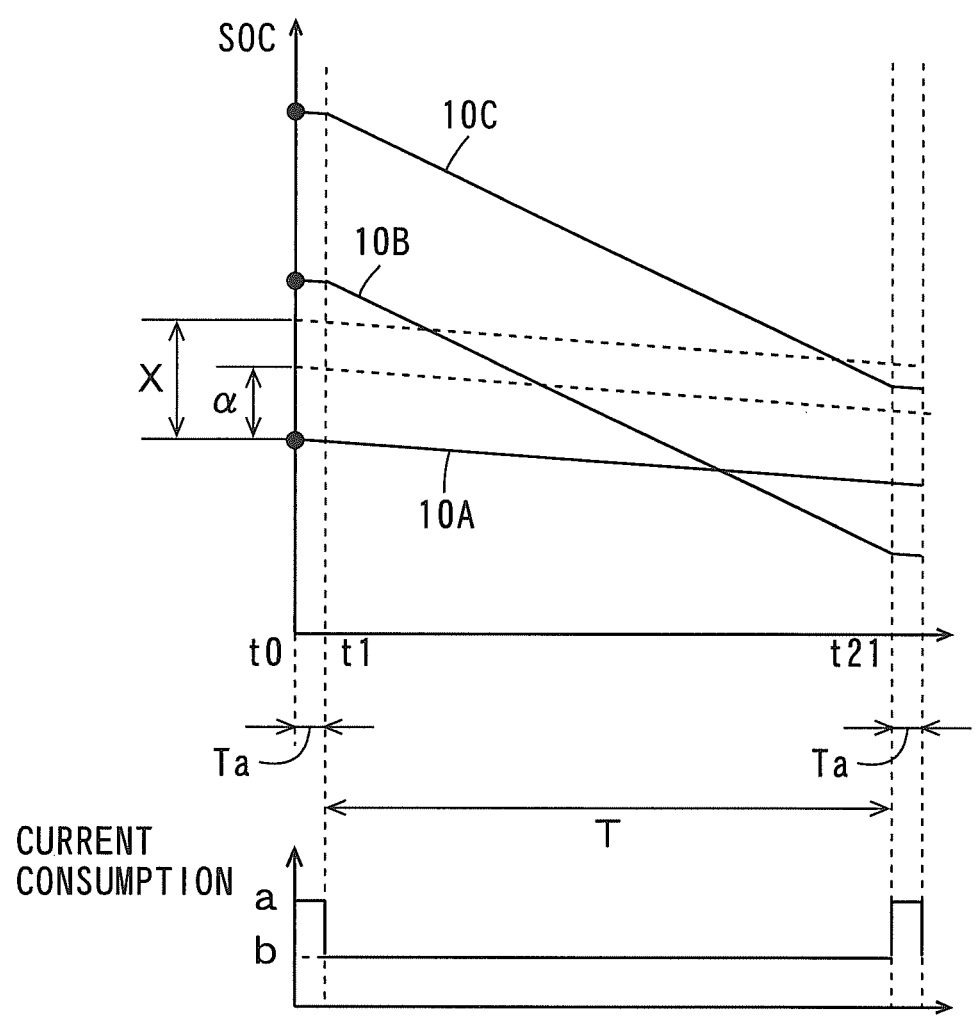

EQUALIZATION DEVICE, BATTERY SYSTEM AND ELECTRIC VEHICLE INCLUDING THE SAME, EQUALIZATION PROCESSING PROGRAM, AND EQUALIZATION PROCESSING METHOD

CROSS REFERENCE TO RELATED APPLICATIONS

This application claims priority to Japanese Patent App. No. 2009-271732, filed Nov. 30, 2009, which is incorporated herein by reference in its entirety.

BACKGROUND OF THE INVENTION

1. Field of the Invention

The present invention relates to an equalization device, a battery system and an electric vehicle including the same, an equalization processing program, and an equalization processing method.

2. Description of the Background Art

Chargeable and dischargeable battery modules are used as driving sources of movable objects such as electric automobiles. Such battery modules each have a plurality of battery cells (electric cells) connected in series, for example.

There have recently been developed battery modules using lithium-ion batteries as the plurality of battery cells. The characteristics of the lithium-ion battery are more prone than a nickel metal hydride battery to deterioration to be caused by overcharge and overdischarge.

Charge-discharge characteristics vary among the plurality of battery cells. Therefore, it is preferable that charge-discharge of each battery cell is individually controlled in order to prevent the cell from being overcharged or overdischarged.

There has been proposed a method of detecting remaining capacities of the plurality of battery cells (amounts of charges stored in the battery cells in a given state) and equalizing the remaining capacities of the battery cells based on the detected remaining capacities (see JP 2003-284253 A, for example).

A battery module described in JP 2003-284253 A includes a battery block (battery pack), a voltage measuring circuit, a microcomputer, a plurality of bypass resistors and a plurality of field effect transistors (FETs).

The battery block is composed of a plurality of battery cells connected in series. The bypass resistor and the FET are connected in parallel to each battery cell. The voltage measuring circuit is connected to the plurality of battery cells, and acquires open circuit voltage values of the plurality of battery cells. The microcomputer is connected to the voltage measuring circuit and the plurality of FETs.

In the battery module, an adjustment amount and an adjustment time period of the remaining capacities of the battery cells are calculated based on the open circuit voltage values of the plurality of battery cells acquired by the voltage measuring circuit for equalizing the remaining capacities of the plurality of battery cells. At this time, an identification number and the adjustment time period of each battery cell that requires the adjustment (an adjustment target battery cell) of the plurality of battery cells are stored in the microcomputer.

The FETs connected to the adjustment target battery cells are simultaneously switched from an OFF state to an ON state at a given timing. The FETs connected in parallel to the adjustment target battery cells are maintained in an ON state for the calculated adjustment time period, thereby causing currents to flow through the bypass resistors. This causes the adjustment target battery cells to be discharged, thus equalizing the remaining capacities of the plurality of battery cells.

It is difficult, however, to accurately set the remaining capacities of the plurality of battery cells within an appropriate range in the battery module of JP 2003-284253 A. Therefore, each battery cell cannot be sufficiently prevented from being overcharged or overdischarged.

BRIEF SUMMARY OF THE INVENTION

An object of the present invention is to provide an equalization device that allows charge states of a plurality of battery cells to be accurately set, a battery system and an electric vehicle including the same, an equalization processing program, and an equalization processing method.

According to an aspect of the present invention, an equalization device arranged to perform equalization processing of charge states of a plurality of battery cells including first and second battery cells includes a detector arranged to detect the charge states of the plurality of battery cells, and an equalization processing unit arranged to change the charge state of the second battery cell of the plurality of battery cells for an equalization processing time period based on the charge states detected by the detector such that the charge state of the second battery cell is close to the charge state of the first battery cell of the plurality of battery cells, wherein the equalization processing time period is calculated or set based on a rate of change in the charge state of the first battery cell and a rate of change in the charge state of the second battery cell such that a magnitude relationship between the charge state of the first battery cell and the charge state of the second battery cell is not reversed.

In the equalization device, the charge states of the plurality of battery cells are detected by the detector. Based on the detected charge states, the charge state of the second battery cell is changed by the equalization processing unit for the equalization processing time period, so that the charge state of the second battery cell is brought close to the charge state of the first battery cell.

In this case, the equalization processing time period is calculated or set based on the rate of change in the charge state of the first battery cell and the rate of change in the charge state of the second battery cell in the equalization processing such that the magnitude relationship between the charge state of the first battery cell and the charge state of the second battery cell is not reversed. Accordingly, the charge states of the plurality of battery cells can be accurately within an appropriate range. This allows the charge states of the plurality of battery cells to be properly equalized.

The equalization device may further include a calculator arranged to calculate the rate of change in the charge state of the first battery cell and the rate of change in the charge state of the second battery cell in the equalization processing based on the charge states detected by the detector and calculate the equalization processing time period based on the calculated rates of change such that the magnitude relationship between the charge state of the first battery cell and the charge state of the second battery cell is not reversed, wherein the equalization processing unit may change the charge state of the second battery cell for the equalization processing time period calculated by the calculator.

In this case, the rate of change in the charge state of the first battery cell and the rate of change in the charge state of the second battery cell in the equalization processing is calculated based on the detected charge states. The equalization processing time period is calculated based on the calculated rates of change such that the magnitude relationship between the charge state of the first battery cell and the charge state of the second battery cell is changed by the equalization processing unit for the equalization processing time period calculated by the calculator in the equalization processing. Accordingly, the charge states of the plurality of battery cells can be accurately within an appropriate range. This allows the charge states of the plurality of battery cells to be properly equalized.

The equalization device may further include a storage arranged to store the equalization processing time period that has been preset, wherein the equalization processing unit may change the charge state of the second battery cell for the equalization processing time period stored in the storage.

In this case, the equalization processing time period is preset based on the rate of change in the charge state of the first battery cell and the rate of change in the charge state of the second battery cell in the equalization processing such that the magnitude relationship between the charge state of the first battery cell and the charge state of the second battery cell is not reversed, and then stored in the storage. The charge state of the second battery cell is changed by the equalization processing unit for the equalization processing time period stored in the storage in the equalization processing. Accordingly, the charge states of the plurality of battery cells can be accurately within an appropriate range. This allows the charge states of the plurality of battery cells to be properly equalized.

A prescribed value $\alpha$ may be set based on the rate of change in the charge state of the first battery cell and the rate of change in the charge state of the second battery cell in the equalization processing, and the equalization processing unit may compare the charge state of the first battery cell and the charge state of the second battery cell, and change the charge state of the second battery cell for the equalization processing time period when a difference between the charge state of the first battery cell and the charge state of the second battery cell is larger than the prescribed value $\alpha$.

In this case, the charge state of the second battery cell is brought close to the charge state of the first battery cell when the difference between the charge state of the first battery cell and the charge state of the second battery cell is larger than the prescribed value $\alpha$. Therefore, the prescribed value $\alpha$ is set to an appropriate value based on the rate of change in the charge state of the first battery cell and the rate of change in the charge state of the second battery cell, so that the charge states of the plurality of battery cells can be efficiently and accurately within the appropriate range.

The equalization processing may be processing of discharging the second battery cell, a battery cell having a reference charge state may be detected as the first battery cell, and assuming that D1 represents the rate of change in the charge state of the second battery cell subjected to discharge, D2 represents the rate of change in the charge state of the first battery cell not subjected to discharge, and T represents a time period of the discharge, the equalization processing time period may be the time period of the discharge T that is set such that $T \leq \alpha/|D1-D2|$ is satisfied.

In this case, the second battery cell is discharged when the charge state of the first battery cell having the reference charge state and the charge state of the second battery cell are compared, and the resulting difference is larger than $\alpha$. Thus, the charge state of the second battery cell is brought close to the charge state of the first battery cell.

Here, an amount of change in the difference between the charge state of the first battery cell and the charge state of the second battery cell is obtained by $T \times |D1-D2|$. Therefore, $T \leq \alpha/|D1-D2|$ is satisfied, so that the amount of change in the difference between the charge state of the first battery cell and the charge state of the second battery cell is smaller than $\alpha$.

This does not cause the magnitude relationship between the charge state of the first battery cell and the charge state of the second battery cell to be reversed. Accordingly, the charge states of the plurality of battery cells can be accurately within the appropriate range.

The equalization processing may be processing of discharging the second battery cell, a battery cell having a reference charge state may be detected as the first battery cell, and the equalization processing unit may include a discharging circuit that can be switched to selectively discharge the plurality of battery cells, and a controller that switches the discharging circuit, the controller may proceed to a non-operating state where the controller does not switch the discharging circuit after an operating state where the controller switches the discharging circuit based on the charge states detected by the detector such that the second battery cell is subjected to discharge and the first battery cell is not subjected to discharge, and assuming that Ta represents a time period of the operating state, a represents current consumption by the controller in the operating state, b represents current consumption by the controller in the non-operating state, and $\beta$ represents a maximum allowable amount of an average amount of current consumption by the controller in the operating state and the non-operating state, the equalization processing time period may be a time period of the discharge T that is set such that $Ta \times (a-\beta)/(\beta-b) \leq T$ is satisfied. In this case, $Ta \times (a-\beta)/(\beta-b) \leq T$ is satisfied, so that the average current consumption per unit time of the controller in the operating state and the non-operating state is smaller than the allowable value $\beta$. This prevents a current from being excessively consumed by the controller.

The charge state may be any of a rate of charge, a remaining capacity, voltage, depth of discharge, a current integrated value and a difference of an amount of stored charges. The remaining capacities of the plurality of battery cells can be equalized in any of the cases of using the rate of charge, the remaining capacity, the voltage, the depth of discharge, the current integrated value and the difference of the amount of stored charges as the charge state.

According to another aspect of the present invention, a battery system includes a plurality of battery cells connected in series and the equalization device according to the foregoing invention.

In the battery system, the charge states of the plurality of battery cells are equalized by the equalization device according to the foregoing invention. This allows the charge states of the plurality of battery cells to be accurately set. Thus, the charge states of the plurality of battery cells can be properly equalized. This results in improved characteristics of the battery system.

According to still another aspect of the present invention, an electric vehicle includes a plurality of battery cells, the equalization device according to the foregoing invention, a motor driven by electric power supplied from the plurality of battery cells, and a drive wheel rotated by a torque generated by the motor.

In the electric vehicle, the motor is driven by the electric power supplied from the plurality of battery cells. The drive wheel is rotated by the torque generated by the motor, thereby moving the electric vehicle.

The charge states of the plurality of battery cells are equalized by the equalization device according to the foregoing invention. This allows the charge states of the plurality of battery cells to be accurately set. Accordingly, the charge states of the plurality of battery cells can be properly equalized. As a result, each battery cell can be prevented from being overdischarged or overcharged, and driving performance of the electric vehicle can be improved.

According to yet another aspect of the present invention, an equalization processing program that is executable by a computer included in an equalization device arranged to perform equalization processing of charge states of a plurality of battery cells including first and second battery cells causes the computer to execute the processes of acquiring the charge states of the plurality of battery cells, acquiring an equalization processing time period, and changing the charge state of the second battery cell of the plurality of battery cells for the acquired equalization processing time period based on the acquired charge states such that the charge state of the second battery cell is close to the charge state of the first battery cell of the plurality of battery cells, wherein the equalization processing time period is calculated or set based on a rate of change in the charge state of the first battery cell and a rate of change in the charge state of the second battery cell such that a magnitude relationship between the charge state of the first battery cell and the charge state of the second battery cell is not reversed.

In the equalization processing program, the charge states of the plurality of battery cells and the equalization processing time period are acquired. The charge state of the second battery cell is changed for the acquired equalization processing time period based on the acquired charge states, so that the charge state of the second battery cell is brought close to the charge state of the first battery cell.

In this case, the equalization processing time period is calculated or set based on the rate of change in the charge state of the first battery cell and the rate of change in the charge state of the second battery cell in the equalization processing such that the magnitude relationship between the charge state of the first battery cell and the charge state of the second battery cell is not reversed. Accordingly, the charge states of the plurality of battery cells can be accurately within an appropriate range. This allows the charge states of the plurality of battery cells to be properly equalized.

The process of acquiring the equalization processing time period may include the processes of calculating the rate of change in the charge state of the first battery cell and the rate of change in the charge state of the second battery cell in the equalization processing based on the acquired charge states, and calculating the equalization processing time period based on the calculated rates of change such that the magnitude relationship between the charge state of the first battery cell and the charge state of the second battery cell is not reversed.

Alternatively, the step of acquiring the equalization processing time period may include the step of retrieving the equalization processing time period that is stored in advance.

According to still another aspect of the present invention, an equalization processing method for performing equalization processing of charge states of a plurality of battery cells including first and second battery cells includes the steps of detecting the charge states of the plurality of battery cells, acquiring an equalization processing time period, and changing the charge state of the second battery cell of the plurality of battery cells for the acquired equalization processing time period based on the detected charge states such that the charge state of the second battery cell is close to the charge state of the first battery cell of the plurality of battery cells, wherein the equalization processing time period is calculated or set based on a rate of change in the charge state of the first battery cell and a rate of change in the charge state of the second battery cell such that a magnitude relationship between the charge state of the first battery cell and the charge state of the second battery cell is not reversed.

In the equalization processing method, the charge states of the plurality of battery cells are detected, and the equalization processing time period is acquired. The charge state of the second battery cell is changed for the acquired equalization processing time period based on the detected charge states, so that the charge state of the second battery cell is brought close to the charge state of the first battery cell.

In this case, the equalization processing time period is calculated or set based on the rate of change in the charge state of the first battery cell and the rate of change in the charge state of the second battery cell in the equalization processing such that the magnitude relationship between the charge state of the first battery cell and the charge state of the second battery cell is not reversed. Accordingly, the charge states of the plurality of battery cells can be accurately within an appropriate range. This allows the charge states of the plurality of battery cells to be properly equalized.

The step of acquiring the equalization processing time period may include the steps of calculating the rate of change in the charge state of the first battery cell and the rate of change in the charge state of the second battery cell in the equalization processing based on the detected charge states, and calculating the equalization processing time period based on the calculated rates of change such that the magnitude relationship between the charge state of the first battery cell and the charge state of the second battery cell is not reversed.

Alternatively, the step of acquiring the equalization processing time period may include the step of retrieving the equalization processing time period that has been stored in advance.

Other features, elements, characteristics, and advantages of the present invention will become more apparent from the following description of preferred embodiments of the present invention with reference to the attached drawings.

BRIEF DESCRIPTION OF THE SEVERAL VIEWS OF THE DRAWINGS

FIG. 1 is a block diagram showing the configuration of a battery system including an equalization device according to a first embodiment;

FIG. 4 is a diagram for explaining problems that arise when an equalization processing time period is comparatively long;

DETAILED DESCRIPTION OF THE INVENTION

Figure 2:
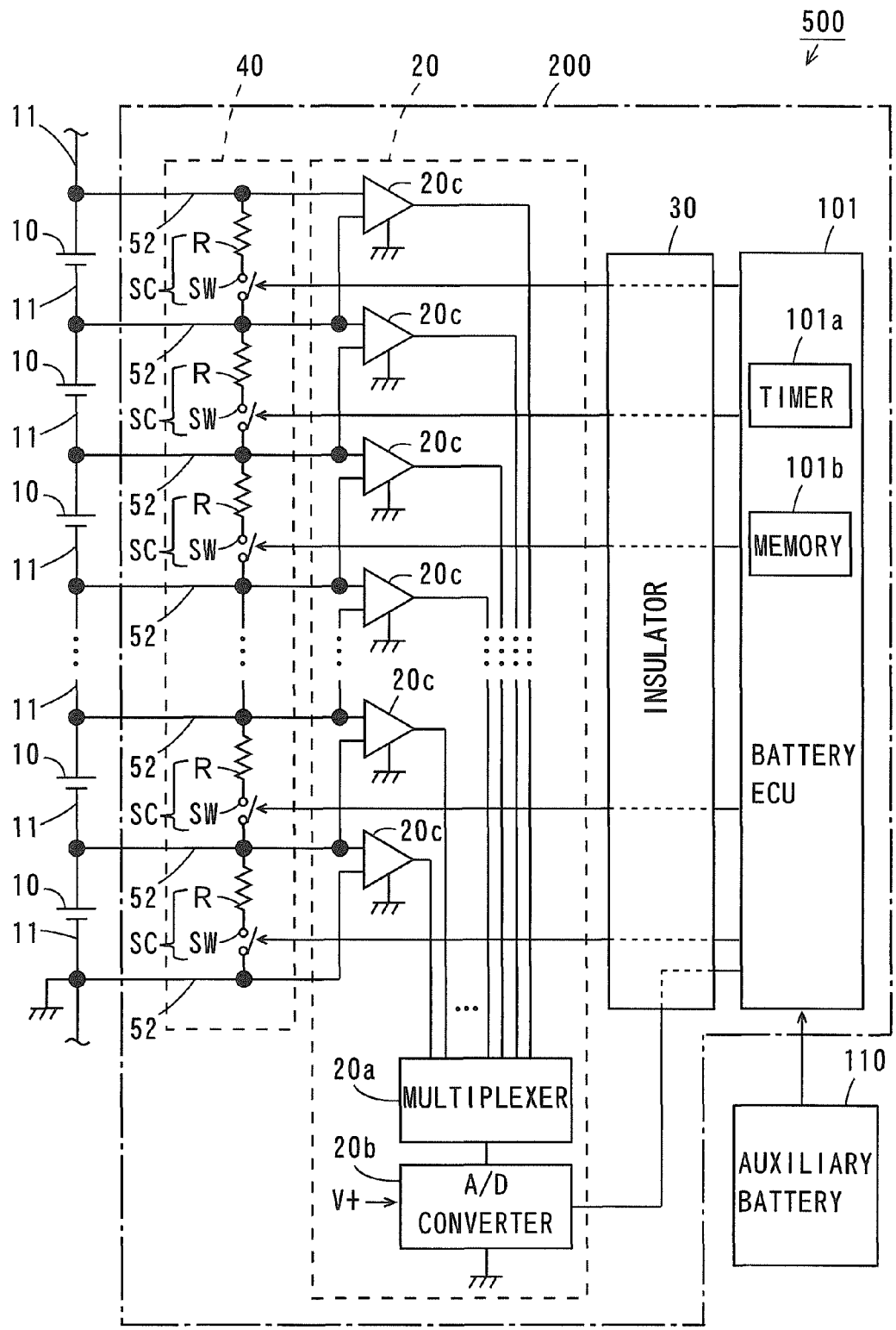
FIG. 2 is a block diagram showing the basic configuration of the equalization device of FIG. 1.

Description will be made of an equalization device, a battery system, a vehicle, an equalization processing program and an equalization processing method according to embodiments of the present invention while referring to drawings.

The equalization device according to the present embodiment is used as one of components constituting the battery system that is mounted on an electric vehicle using electric power as a driving source, and equalizes charge states of a plurality of battery cells. Examples of the electric vehicle include a hybrid electric vehicle, a battery electric vehicle, and a plug-in hybrid electric vehicle. The electric vehicle refers to a hybrid electric vehicle in the present embodiment.

In the following description, an amount of electric charges stored in a battery cell in a full charge state is referred to as a full charge capacity. An amount of electric charges stored in the battery cell in a given state is referred to as a remaining capacity. A ratio of the remaining capacity to the full charge capacity of the battery is referred to as an SOC (a rate of charge). In the present embodiment, the SOC of the battery cell is used as an example of the charge state of the battery cell.

(1) Configuration of the Battery System

FIG. 1 is a block diagram showing the configuration of the battery system including the equalization device according to a first embodiment. In the present embodiment, the battery system 500 includes a plurality of battery modules 100 (four in the example of FIG. 1) and a battery electronic control unit (hereinafter referred to as a battery ECU) 101, and connected to a main controller 300 of the electric vehicle through a bus 104.

The main controller 300 is composed of a central processing unit (CPU) and a memory, or composed of a microcomputer, for example, and controls the battery system 500 and a motor and so on included in the electric vehicle. The motor generates a driving force during driving of the electric vehicle.

A start instruction unit 301 is connected to the main controller 300. The start instruction unit 301 includes a start key used for instructing the electric vehicle to start. When the start key is turned on by a user, the main controller 300 controls the battery system 500 such that electric power can be supplied to the above-mentioned motor. This allows the electric vehicle to be driven.

The plurality of battery modules 100 of the battery system 500 are connected to one another through power supply lines 501. Each battery module 100 includes a plurality of (eighteen in the example of FIG. 1) battery cells 10, a detecting unit 20 and a discharging unit 40.

The plurality of battery cells 10 are connected in series by a plurality of bus bars 11 in each battery module 100. Each of the battery cells 10 is a secondary battery. A lithium-ion battery is used as the secondary battery in this example.

The battery cells 10 arranged at both ends of the battery module 100 are connected to the power supply lines 501 through the bus bars 11, respectively. In this manner, all the battery cells 10 of the plurality of battery modules 100 are connected in series in the battery system 500. The power supply lines 501 pulled out from the battery system 500 are connected to a load such as the motor of the electric vehicle.

The plurality of battery cells 10 are connected to the detecting unit 20 via the discharging unit 40. The detecting unit 20 is connected to the battery ECU 101 by a communication line 560 via an insulator 30.

The detecting unit 20 detects charge states of the plurality of battery cells 10, and applies the charge states to the battery ECU 101. The detecting unit 20 may apply the detected charge states of the plurality of battery cells 10 to the battery ECU 101 as digital values. The detecting unit 20 may multiplex the detected charge states of the plurality of battery cells 10 and apply the multiplexed charge states to the battery ECU 101.

The detecting unit 20 detects terminal voltages of the plurality of battery cells 10 as the charge states, and applies the charge states to the battery ECU 101 in the present embodiment. The discharging unit 40 is controlled by the battery ECU 101 and used for discharging the plurality of battery cells 10. Specific examples of the detecting unit 20 and the discharging unit 40 will be described below.

In the battery system 500 of FIG. 1, the equalization device 200 is composed of the detecting unit 20, the insulator 30, the discharging unit 40 and the battery ECU 101.

An auxiliary battery 110 of the electric vehicle is connected to the battery ECU 101 of the equalization device 200. The auxiliary battery 110 is used as a power source of the battery ECU 101. The auxiliary battery 110 is a lead-acid battery in the present embodiment. Meanwhile, the plurality of battery cells 10 connected in series are used as power sources of the detecting unit 20 and the discharging unit 40. Communication is established between the battery ECU 101 and the detecting unit 20 through the insulator 30. Therefore, the battery ECU 101 operated by the auxiliary battery 110 and the detecting unit 20 and discharging unit 40 operated by the plurality of battery cells 10 are connected to communicate with each other while being electrically insulated from each other by the insulator 30. As a result, the battery ECU 101 can stably and independently operate, and the detecting unit 20 and discharging unit 40 can stably and independently operate. An insulating element such as a digital isolator, a photocoupler or the like can be used as the insulator 30.

The battery ECU 101 is connected to the main controller 300 through the bus 104. As described above, the terminal voltages of the plurality of battery cells 10 are applied from the detecting unit 20 to the battery ECU 101. Thus, the battery ECU 101 detects the remaining capacity of each battery module 100 (the remaining capacities of the plurality of battery cells 10), and applies detection results to the main controller 300.

When the start key of the start instruction unit 301 is turned on, the main controller 300 controls mechanical power of the electric vehicle (a rotational speed of the motor, for example) based on the remaining capacity applied from the battery ECU 101. When the remaining capacity of each battery module 100 decreases, the main controller 300 controls a power generator, not shown, connected to the power supply line 501 to charge each battery module 100 (the plurality of battery cells 10).

The above-mentioned motor connected to the power supply line 501, for example, functions as the power generator in the present embodiment. In this case, the motor converts electric power supplied from the battery system 500 into mechanical power for driving a drive wheel, not shown, at the time of acceleration of the electric vehicle, and generates regenerated electric power at the time of deceleration of the electric vehicle. Each battery module 100 is charged with the regenerated electric power.

When the start key of the start instruction unit 301 is turned off, the main controller 300 controls the battery ECU 101 to perform equalization processing of the plurality of battery cells 10. The battery ECU 101 detects current consumption by the auxiliary battery 110 in the equalization processing. Details of the equalization processing will be described below.

FIG. 2 is a block diagram showing a specific example of the configuration of the equalization device 200 of FIG. 1. In the example of FIG. 2, the detecting unit 20 includes a multiplexer 20a, an A/D (Analog/Digital) converter 20b and a plurality of differential amplifiers 20c. The discharging unit 40 includes a plurality of series circuits SC each composed of a resistor R and a switching element SW.

The plurality of differential amplifiers 20c of the detecting unit 20 are provided corresponding to the plurality of battery cells 10, respectively. Each differential amplifier 20c has two input terminals and an output terminal. The two input terminals of each differential amplifier 20c are electrically connected to the two bus bars 11 that are adjacent to each other with the corresponding battery cell 10 therebetween by conductor lines 52. Each differential amplifier 20c differentially amplifies voltages input to the two input terminals, and outputs the amplified voltages from the output terminal.

The output voltages from the plurality of differential amplifiers 20c are applied to the multiplexer 20a. The multiplexer 20a sequentially outputs the output voltages from the plurality of differential amplifiers 20c to the A/D converter 20b. The A/D converter 20b converts the output voltages from the multiplexer 20a into digital values, and applies the converted digital values to the battery ECU 101 via the insulator 30 as the terminal voltages. In this manner, the terminal voltages of the plurality of battery cells 10 are sequentially applied from the A/D converter 20b to the battery ECU 101.

The plurality of series circuits SC of the discharging unit 40 are also provided corresponding to the plurality of battery cells 10, respectively. Each series circuit SC is electrically connected to the two bus bars 11 that are adjacent to each other with the corresponding battery cell 10 therebetween by the conductor lines 52. The battery ECU 101 controls the switching elements SW to be turned on and off through the insulator 30.

The battery ECU 101 may include a central processing unit (CPU), a timer 101a and a memory 101b. The battery ECU 101 may include a microcomputer instead of the CPU and the memory 101b. The timer 101a is used for measuring start time described below. The memory 101b stores an equalization processing program for performing the equalization processing, described below, and stores various information used in the equalization processing.

As described above, when the start key of the start instruction unit 301 is turned off, the CPU of the battery ECU 101 executes the equalization processing program stored in the memory 101b, thereby performing the equalization processing of the plurality of battery cells 10.

(2) Change in the SOC of Each Battery Cell and Change in Current Consumption by the Battery ECU in the Equalization Processing Next, the equalization processing by the battery ECU 101 will be more specifically described.

Figure 3:
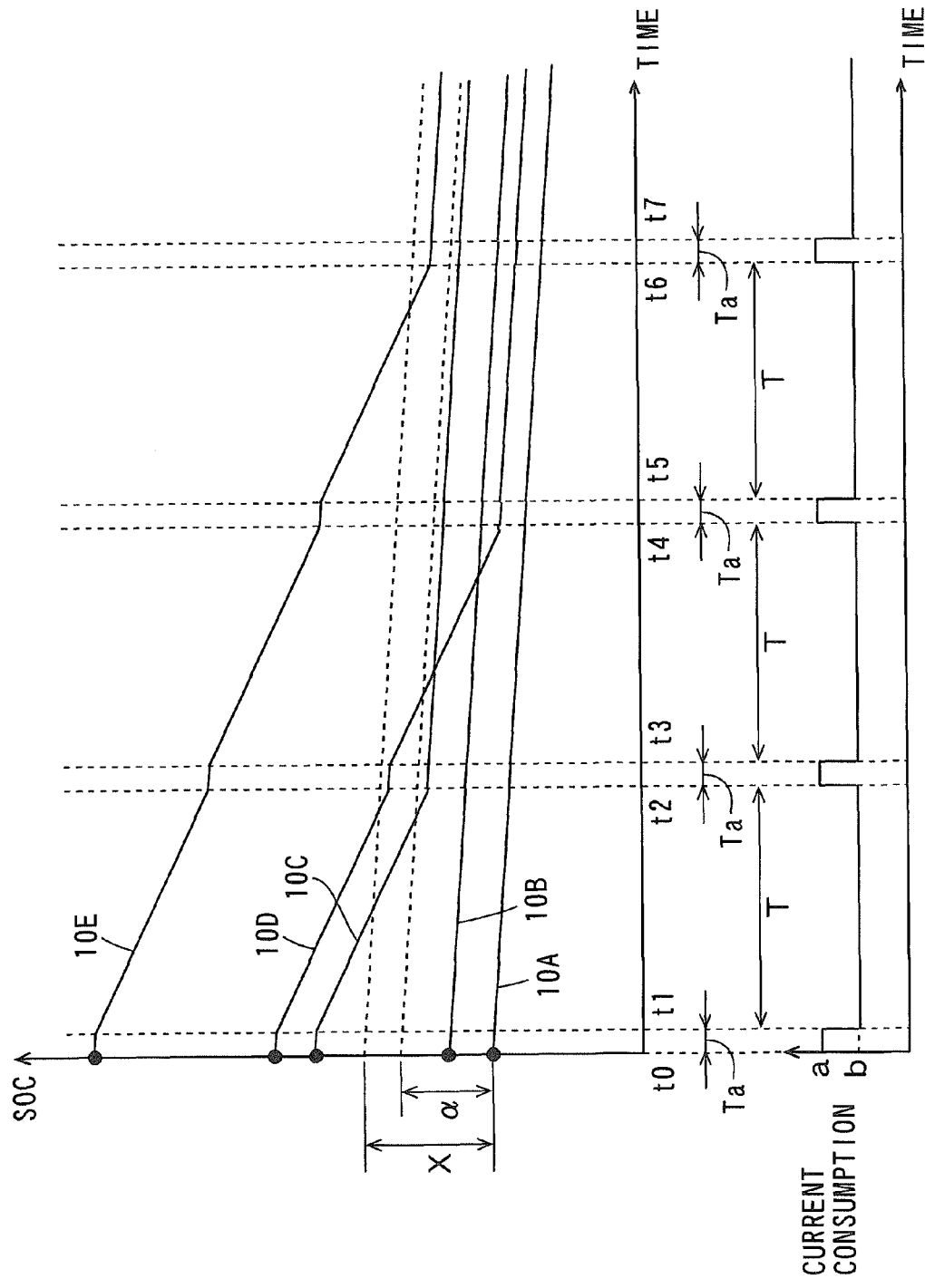
FIG. 3 is a diagram showing change in an SOC of each battery cell and change in current consumption by a battery ECU in equalization processing.

FIG. 3 is a diagram showing change in the SOC of each battery cell 10 and change in current consumption by the battery ECU 101 in the equalization processing. In an upper stage of FIG. 3, the ordinate represents the SOC of each battery cell 10, and the abscissa represents time. In a lower stage of FIG. 3, the ordinate represents the current consumption by the battery ECU 101, and the abscissa represents time.

FIG. 3 shows changes in the SOCs of five battery cells 10. Hereinafter, the five battery cells 10 shown in FIG. 3 are referred to as the battery cells 10A, 10B, 10C, 10D, 10E. In this example, the battery cell 10A is an example of a first battery cell, and the battery cells 10B to 10E are examples of a second battery cell. Note that the first battery cell has a reference charge state.

In the present embodiment, the switching elements SW corresponding to the plurality of battery cells 10 are periodically switched such that a difference between the maximum SOC (hereinafter referred to as the SOCmax) and the minimum SOC (hereinafter referred to as the SOCmin) of the SOCs of the plurality of battery cells 10 is not more than a prescribed value X that has been set in advance. In this case, the SOCmin is an example of the reference charge state, and the battery cell 10 having the SOCmin is detected as the first battery cell.

More specifically, the SOCs of the battery cells 10 are periodically detected, and the SOCmin and the SOCmax are determined. Then, the switching element SW corresponding to the battery cell 10, which has the larger SOC than a value (SOCmin+α) obtained by adding a prescribed value α that has been set in advance to the SOCmin, is turned on. Meanwhile, the switching element SW corresponding to the battery cell 10 having the SOC of not more than the SOCmin+α is turned off.

In the example of FIG. 3, the switching elements SW corresponding to all the battery cells 10A to 10E are turned off at a time point t0. The SOC of the battery cell 10E is the SOCmax, and the SOC of the battery cell 10A is the SOCmin in a period from the time point t0 to a time point t1, during which a given processing time period Ta elapses. A difference between the SOC of the battery cell 10E and the SOC of the battery cell 10A is larger than the prescribed value X. The SOC of each of the battery cells 10C to 10E is larger than the SOCmin+α, and the SOC of each of the battery cells 10A, 10B is not more than the SOCmin+α.

In this case, the switching elements SW corresponding to the battery cells 10C to 10E are turned on at the time point t1. Thus, the charges stored in the battery cells 10C to 10E are discharged through the resistors R, causing the SOCs of the battery cells 10C to 10E to gradually decrease. Meanwhile, the charges stored in the battery cells 10A, 10B are consumed by the detecting unit 20 and the discharging unit 40. This also causes the SOCs of the battery cells 10A, 10B to gradually decrease.

A rate of change in the SOC of each of the battery cells 10C to 10E is larger than that of each of the battery cells 10A, 10B. Here, the rate of change in the SOC refers to an amount of change in the SOC per unit time. This causes the SOC of each of the battery cells 10C to 10E to come close to the SOC of the battery cell 10A.

After an elapse of a preset equalization processing time period T from the time point t1, that is, at a time point t2, the switching elements SW corresponding to the battery cells 10C to 10E are turned off. In a period from the time point t2 to a time point t3, during which the given processing time period Ta elapses, the difference between the SOC (SOCmin) of the battery cell 10A and the SOC (SOCmax) of the battery cell 10E is larger than the prescribed value X. The SOC of each of the battery cells 10D, 10E is larger than the SOCmin+α, and the SOC of each of the battery cells 10A to 10C is not more than the SOCmin+α.

In this case, the switching elements SW corresponding to the battery cells 10D, 10E are turned on at the time point t3. This causes the SOC of each of the battery cells 10D, 10E to come close to the SOC (SOCmin) of the battery cell 10A.

Next, the switching elements SW corresponding to the battery cells 10D, 10E are turned off after an elapse of the preset equalization processing time period T from the time point t3, that is, at a time point t4. In a period from the time point t4 to the time point t5, during which the given processing time period Ta elapses, the difference between the SOC (SOCmin) of the battery cell 10A and the SOC (SOCmax) of the battery cell 10E is larger than the prescribed value X. The SOC of the battery cell 10E is larger than the SOCmin+α, and the SOC of each of the battery cells 10A to 10D is not more than the SOCmin+α.

In this case, the switching element SW corresponding to the battery cell 10E is turned on at the time point t5. This causes the SOC of the battery cell 10E to come close to the SOC (SOCmin) of the battery cell 10A.

After an elapse of the preset equalization processing time period T from the time point t5, that is, at a time point t6, the switching element SW corresponding to the battery cell 10E is turned off. In a period from the time point t6 to a time point t7, during which the given processing time period Ta elapses, the difference between the SOC (SOCmin) of the battery cell 10A and the SOC (SOCmax) of the battery cell 10E is not more than the prescribed value X. Accordingly, the equalization processing is terminated.

In this manner, the equalization processing causes differences among the SOCs of all the battery cells 10 to be within the range of the prescribed value X. This prevents overcharge and overdischarge from occurring when the plurality of battery cells 10 are charged and discharged through the power supply lines 501. As a result, each of the battery cells 10 is prevented from being degraded.

In this example, the battery ECU 101 is in an operating state in the period from the time point t0 to the time point t1, the period from the time point t2 to the time point t3, the period from the time point t4 to the time point t5, and the period from the time point t6 to the time point t7. In the operating state, the battery ECU 101 operates according to the equalization processing program, described below.

Meanwhile, the battery ECU 101 proceeds to the non-operating state in the period from the time point t1 to the time point t2, the period from the time point t3 to the time point t4, and the period from the time point t5 to the time point t6. In the non-operating state, the battery ECU 101 maintains states of the switching elements SW and does not execute control operation such as switching. Thus, current consumption a by the battery ECU 101 in the operating state is larger than current consumption b by the battery ECU 101 in the non-operating state as shown in the lower stage of FIG. 3.

(3) The Equalization Processing Time Period

Figure 5:
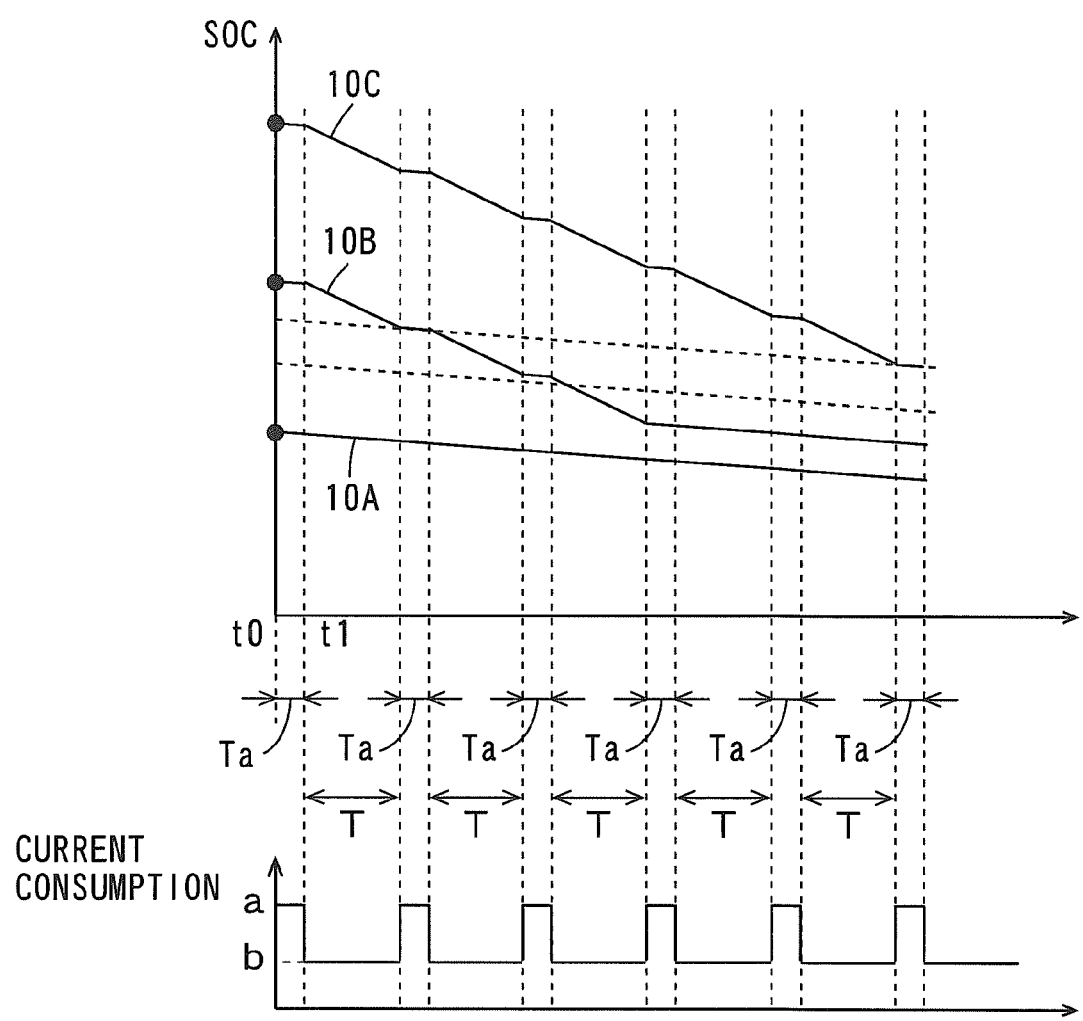
FIG. 5 is a diagram for explaining problems that arise when the equalization processing time period is comparatively short.

The above-mentioned equalization processing time period T needs to be appropriately set for efficient equalization processing. Here, description is made of problems that arise when the equalization processing time period T is not appropriately set. FIG. 4 is a diagram for explaining problems that arise when the equalization processing time period T is comparatively long, and FIG. 5 is a diagram for explaining problems that arise when the equalization processing time period T is comparatively short. In upper stages of FIGS. 4 and 5, the ordinate represents the SOC of each battery cell 10, and the abscissa represents time. In lower stages of FIGS. 4 and 5, the ordinate represents current consumption by the battery ECU 101, and the abscissa represents time. FIGS. 4 and 5 show changes in the SOCs of the battery cells 10A, 10B, 10C.

In the example of FIG. 4, the SOC of the battery cell 10C is the SOCmax, and the SOC of the battery cell 10A is the SOCmin in the processing time period Ta from the time point t0 to the time point t1. The difference between the SOC of the battery cell 10C and the SOC of the battery cell 10A is larger than the prescribed value X. The SOC of each of the battery cells 10B, 10C is larger than the SOCmin+α. Therefore, the switching elements SW corresponding to the battery cells 10B, 10C are turned on at the time point t1. Then, after an elapse of an equalization processing time period T from the time point t1, that is, at a time point t21, the switching elements SW corresponding to the battery cells 10B, 10C are turned off.

In this case, a magnitude relationship between the SOC of the battery cell 10B and the SOC of the battery cell 10A is reversed because of the longer equalization processing time period T. That is, the battery cell 10 having the SOCmin is switched from the battery cell 10A to the battery cell 10B. When the battery cell 10 having the SOCmin is replaced, the SOCs of the plurality of battery cells 10 cannot be accurately within the appropriate range. Accordingly, the SOCs of the plurality of battery cells 10 cannot be properly equalized.

The example of FIG. 5 is different from the example of FIG. 4 in that the switching elements SW corresponding to the battery cells 10B, 10C are turned on at the time point t1, and the switching elements SW corresponding to all the battery cells 10 are turned off after every elapse of the equalization processing time period T, and the switching element SW corresponding to the battery cell 10, which has the larger SOC than the SOCmin+α, is turned on after every elapse of the processing time period Ta.

In this case, the shorter equalization processing time period T causes the battery ECU 101 to more frequently proceed to the operating state, resulting in increased current consumption by the battery ECU 101.

Therefore, the equalization processing time period T is appropriately set in order to suppress the current consumption and properly equalize the SOCs of the plurality of battery cells 10 in the present embodiment. Description will be made of details of a method of setting the equalization processing time period T.

(4) Method of Calculating the Equalization Processing Time Period

(4-1) Lower Limit of the Equalization Processing Time Period T

Average current consumption per unit time by the battery ECU 101 during the equalization processing is preferably not more than a given allowable value for maintaining the characteristics of the auxiliary battery 110 (FIG. 1).

Assuming that a represents the current consumption by the battery ECU 101 in the operating state, and b represents the current consumption by the battery ECU 101 in the non-operating state, the average current consumption per unit time by the battery ECU 101 is obtained by $(a \times Ta + b \times T)/(Ta+T)$. Thus, when β represents the allowable value of the average current consumption, the following equation (1) is preferably satisfied:

$$\{a \times Ta + b \times T\}/(ta+T) \leq \beta \quad (1)$$

where a>β>b. Therefore, the following equation (2) is derived from the equation (1):

$$T \leq Ta \times (a-\beta)/(\beta-b) \quad (2)$$

In the present embodiment, the battery ECU 101 detects the current consumption a and the processing time period Ta as described below. The current consumption b is measured in advance and stored in the memory 101b. The allowable value β is determined in advance by capacity of the auxiliary battery 110 and so on, and stored in the memory 101b. Accordingly, a lower limit (hereinafter referred to as the lower limit Tmin) of the equalization processing time period T is obtained by the equation (2) using the detected current consumption a and processing time period Ta, and the current consumption b and the allowable value β stored in the memory 101b.

(4-2) Allowable Upper Limit of SOCmax-SOCmin

When the plurality of battery cells 10 are charged or discharged through the power supply lines 501, the amounts of change in the remaining capacities of the plurality of battery cells 10 are equal. Therefore, when the remaining capacities of the plurality of battery cells 10 vary, charge needs to be stopped when the remaining capacity of the battery cell 10 having the SOCmax (hereinafter referred to as the maximum capacity cell 10) reaches the full charge capacity in order to prevent each battery cell 10 from being overcharged. In addition, discharge needs to be stopped when the remaining capacity of the battery cell 10 having the SOCmin (hereinafter referred to as the minimum capacity cell 10) reaches a given lower limit in order to prevent each battery cell 10 from being overdischarged.

Thus, the larger difference between the SOCmax and the SOCmin (SOCmax-SOCmin) and the smaller full charge capacity of each battery cell 10 lead to a smaller capacity of each battery cell 10 that can be used in the electric vehicle (hereinafter referred to as a usable capacity).

Usable capacity of the battery module 100 is required to be not less than a given allowable value (hereinafter referred to as a use capacity allowable value) for maintaining driving performance of the electric vehicle. Here, the use capacity allowable value is determined according to the type of the electric vehicle and so on, and is stored in advance in the memory 101b.

In the present embodiment, the full charge capacity of each battery cell 10 is measured by the battery ECU 101 as described below. Then, an allowable upper limit Xmax of SOCmax-SOCmin is calculated based on the measured full charge capacity and the use capacity allowable value stored in the memory 101b such that the usable capacity is not less than the use capacity allowable value. In this case, the prescribed value X is set to a value of not more than the allowable upper limit Xmax as represented by the following equation (3):

$$X \leq X\max \quad (3)$$

As described above, the equalization processing causes SOCmax-SOCmin to be smaller than the prescribed value X. That is, SOCmax-SOCmin is smaller than the allowable upper limit Xmax. Accordingly, the required usable capacity can be ensured, and the driving performance of the vehicle can be maintained.

(4-3) Relationship between the Equalization Processing Time Period T and the Prescribed Values α, X Assuming that D1 represents the ratio of change in the SOC of the battery cell 10 when the corresponding switching element SW is turned on, and D2 represents the ratio of change in the SOC of the battery cell 10 when the corresponding switching element SW is turned off, an amount of change in the difference between the SOCs of the battery cells 10 is obtained by T×|D1−D2| in the equalization processing time period T.

As described above, when the difference between the SOCmax and the SOCmin is larger than X, the switching element SW corresponding to the battery cell 10, which has the larger SOC than the SOCmin+α, is turned on. Here, when T×|D1−D2| is larger than the prescribed value α, the SOC of the battery cell 10 whose corresponding switching element SW is turned on may become smaller than the SOCmin as shown in FIG. 4. That is, the battery cell 10 having SOCmin may be replaced.

Thus, in order to prevent the battery cell 10 having the SOCmin from being replaced, that is, to prevent the magnitude relationship between the SOC of the battery cell 10 having the SOCmin at the time of start of the equalization processing and the SOC of another battery cell 10 from being reversed, the following equation (4) needs to be satisfied:

$$T \times |D1-D2| \leq \alpha \quad (4)$$

Since the prescribed value α is smaller than the prescribed value X, the following equation (5) is derived from the equations (3), (4):

$$T \times |D1-D2| \leq \alpha \leq X \leq X\max \quad (5)$$

In the present embodiment, the battery ECU 101 calculates the rates of change D1, D2 as described below. Accordingly, a relationship between the equalization processing time period T and the prescribed values α, X is obtained by the equation (5) using the calculated rates of change D1, D2.

(4-4) Setting of the Equalization Processing Time Period T and the Prescribed Values α, X As described above, the lower limit Tmin of the equalization processing time period T is obtained by the equation (2). In addition, the relationship between the equalization processing time period T and the prescribed values α, X is obtained by the equation (5). The equalization processing time period T and the prescribed values α, X are set such that the equations (2), (5) are satisfied in the present embodiment.

(5) The Equalization Processing

Figure 6:
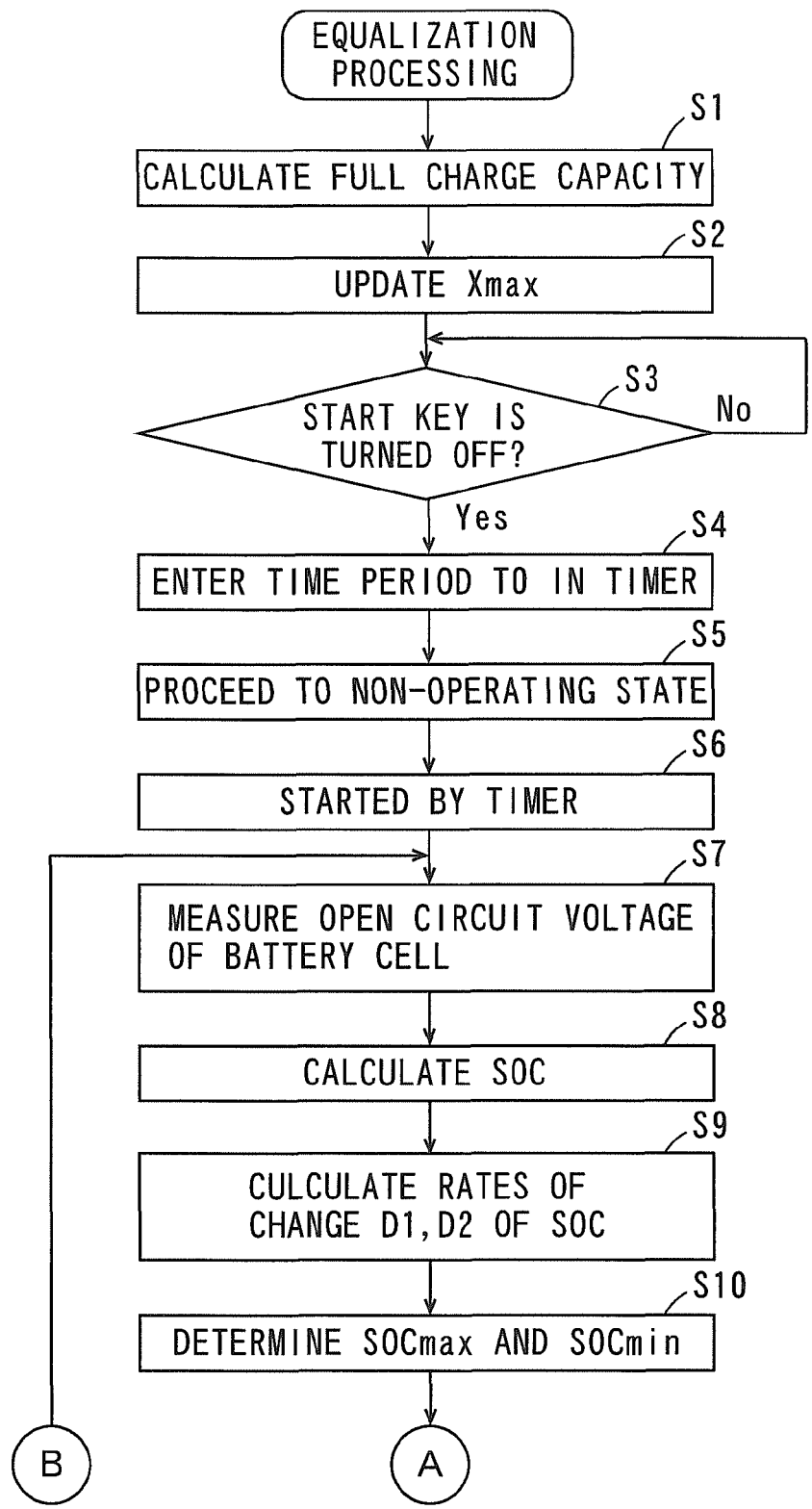
FIG. 6 is a flowchart of the equalization processing performed by the battery ECU.
Figure 7:
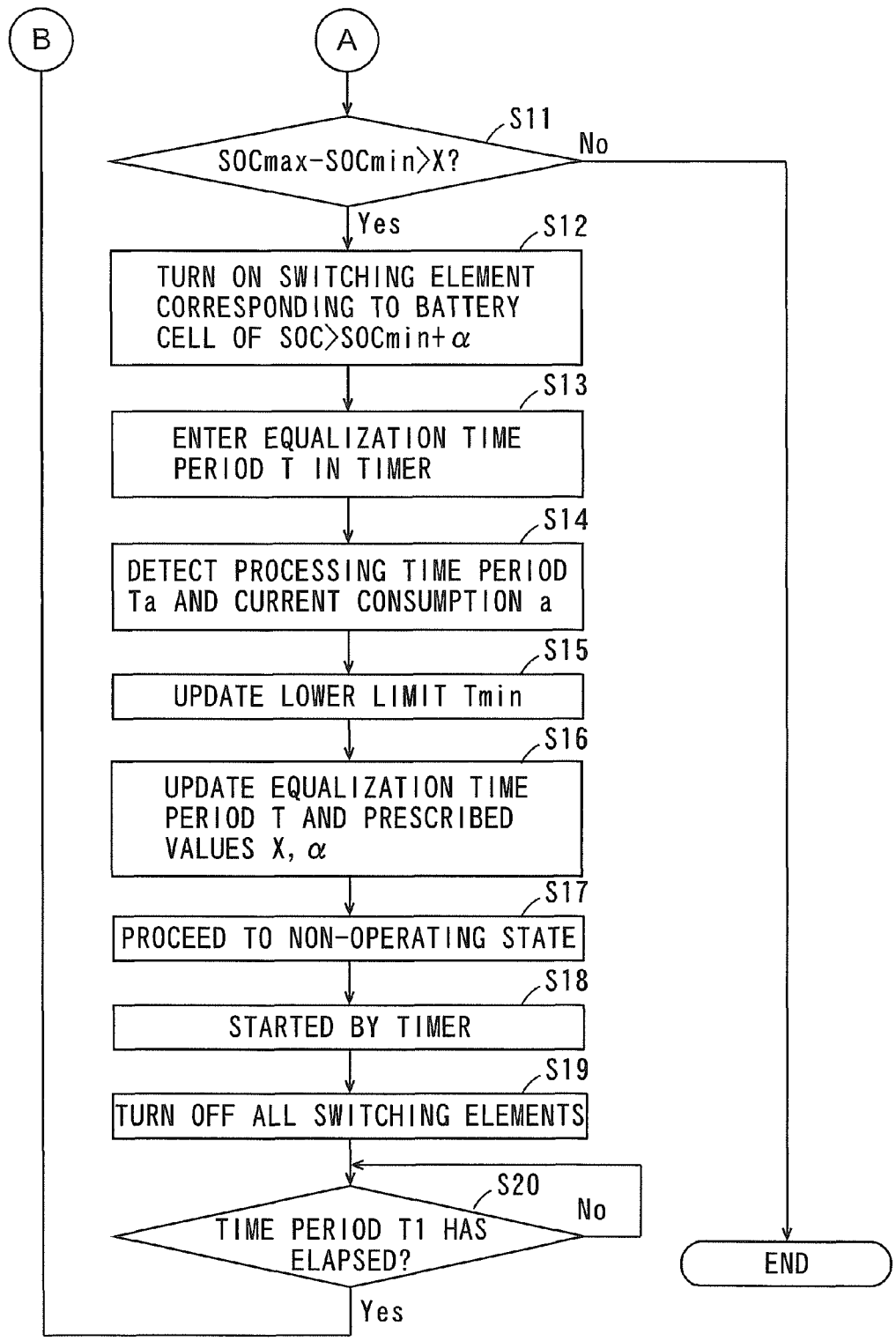
FIG. 7 is a flowchart of the equalization processing performed by the battery ECU.

FIGS. 6 and 7 are flowcharts of the equalization processing performed by the battery ECU 101. In the example of FIGS. 6 and 7, the start key of the start instruction unit 301 is turned on, the battery ECU 101 is in the operating state, and all the switching elements SW are turned off in an initial state.

As shown in FIG. 6, first, the battery ECU 101 measures the full charge capacity of each battery cell 10 (Step S1). The full charge capacity of the battery cell 10 can be measured by an arbitrary known method (see JP 2008-241358 A, for example). Next, the battery ECU 101 calculates the allowable upper limit Xmf of SOCmax-SOCmin based on the measured full charge capacity and the use capacity allowable value stored in the memory 101b, and updates the allowable upper limit Xmax stored in the memory 101b to the calculated value (Step S2).

The battery ECU 101 subsequently determines whether or not the start key of the start instruction unit 301 is turned off (Step S3). When the start key is not turned off, the battery ECU 101 stands by until the start key is turned off.

When the start key is turned off, the battery ECU 101 enter a non-operating time period T0 stored in the memory 101b in the timer 101a (Step S4). In this case, an elapsed time since the non-operating time period T0 has been entered is measured by the timer 101a. The battery ECU 101 then proceeds to the non-operating state (Step S5).

When the elapsed time measured by the timer 101a reaches the non-operating time period T0, the battery ECU 101 is started, and proceeds to the operating state (Step S6). The non-operating time period T0 is set to 60 minutes, for example. In this case, since each battery cell 10 is kept not substantially charged or discharged during the non-operating time period T0, the terminal voltage of each battery cell 10 is stabilized.

Then, the battery ECU 101 measures the open circuit voltage of each battery cell 10 based on the terminal voltage of each battery cell 10 applied from the detecting unit 20 (Step S7). The battery ECU 101 subsequently calculates the SOC of each battery cell 10 based on the relationship between the open circuit voltage of the battery cell 10 and the SOC stored in the memory 101b, and the measured open circuit voltage (Step S8).

The battery ECU 101 then calculates the rates of change D1, D2 of the SOC of each battery cell 10 (Step S9). In this case, the rates of change D1, D2 are not calculated, and initial values of the rates of change D1, D2 stored in advance in the memory 101b are used in the first Step S9 since the start key has been turned off. In the second Step S9 and thereafter, a difference between the SOC of each battery cell 10 calculated in the previous Step S8 and the SOC of each battery cell 10 calculated in the present Step S8 is calculated, and the difference is divided by an elapsed time from the previous Step S8 to the present Step S8, so that the rates of change D1, D2 of the SOC of each battery cell 10 are calculated.

Next, the battery ECU 101 determines the SOCmax and the SOCmin based on the calculated SOC of each battery cell 10 (Step S10).

Next, as shown in FIG. 7, the battery ECU 101 determines whether or not SOCmax-SOCmin is larger than the prescribed value X stored in the memory 101b (Step S11). When SOCmax-SOCmin is not more than the prescribed value X, the battery ECU 101 terminates the equalization processing. When SOCmax-SOCmin is larger than the prescribed value X, the battery ECU 101 turns on the switching element SW corresponding to the battery cell 10, which has the larger SOC than the value obtained by adding the prescribed value α stored in the memory 101b to the SOCmin, of the plurality of battery cells 10 (Step S12).

The battery ECU 101 subsequently enters the equalization processing time period T stored in the memory 101b in the timer 101a (Step S13). In this case, an elapsed time since the equalization processing time period T has been entered is measured by the timer 101a.

Then, the battery ECU 101 detects an elapsed time from Step S6 or Step S18, described below, in which the battery ECU 101 has been started, to Step S14 as the processing time period Ta using the timer 101a, and detects the current consumption a in the operating state (Step S14).

The battery ECU 101 subsequently calculates the lower limit Tmin of the equalization processing time period T by the foregoing equation (2) based on the detected current consumption a and processing time period Ta, and the current consumption b and the allowable value β of the average current consumption in the non-operating state stored in the memory 101b, and updates the lower limit Tmin stored in the memory 101b to the calculated value (Step S15).

Next, the battery cell 10 determines the equalization processing time period T and the prescribed values α, X such that the foregoing equations (2), (5) are satisfied based on the allowable upper limit Xmax calculated in Step S2, the rates of change D1, D2 calculated in Step S9, and the lower limit Tmin of the equalization processing time period T calculated in Step S15, and updates the equalization processing time period T and the prescribed values α, X stored in the memory 101b to the determined values (Step S16).

In this case, the initial values stored in advance in the memory 101b are used as the rates of change D1, D2 in the first Step S16 since the start key has been turned off. The rates of change D1, D2 stored in advance in the memory 101b may be also used in the second Step S16 and thereafter.

After that, the battery ECU 101 proceeds to the non-operating state (Step S17). When the elapsed time measured by the timer 101a reaches the equalization processing time period T, the battery ECU 101 is started, and proceeds to the operating state (Step S18). Next, the battery ECU 101 turns off all the switching elements SW (Step S19).

The battery ECU 101 then determines whether or not a non-operating time period T1 stored in the memory 101b has elapsed since the battery ECU 101 has been started in Step S18 (Step S20). When the non-operating time period T1 has not elapsed, the battery ECU 101 stands by until the non-operating time period T1 elapses. When the non-operating time period T1 has elapsed, the battery ECU 101 repeats the processes of Steps S7 to S20. The non-operating time period T1 is several hundred milliseconds, for example.

(6) Effects

In the equalization device 200 according to the present embodiment, the equalization processing time period T is set based on the rate of change D1 of the SOC of the battery cell 10 whose corresponding switching element SW is turned on and the rate of change D2 of the SOC of the battery cell 10 whose corresponding switching element SW is turned off such that the battery cell 10 having the SOCmin is not replaced. This allows the SOCs of the plurality of battery cells 10 to be accurately within the appropriate range. Accordingly, the SOCs of the plurality of battery cells 10 can be efficiently and properly equalized.

In the equalization device 200 according to the present embodiment, the equalization processing time period T is set such that the average current consumption by the battery ECU 101 is smaller than the allowable value β. This prevents electric power of the auxiliary battery 110 from being excessively consumed by the battery ECU 101 during the equalization processing. Accordingly, the characteristics of the auxiliary battery 110 can be maintained.

In the equalization device 200 according to the present embodiment, the open circuit voltage of each battery cell 10 is measured while all the switching elements SW are turned off in the equalization processing. When any of the switching elements SW is turned on, a voltage drop occurs because of internal resistance of the battery cells 10, the bus bars 11 and the conductor lines 52, contact resistance among the terminals of the battery cells 10, the bus bars 11 and the conductor lines 52 and so on. This results in inaccurate measurement of the open circuit voltage. Therefore, the open circuit voltage of each battery cell 10 is measured while all the switching elements SW are turned off, so that the open circuit voltage of each battery cell 10 can be accurately measured in the equalization device 200 according to the present embodiment.

(7) Other Embodiments (7-1)

While the SOCs of the plurality of battery cells 10 are set within the appropriate range by discharging the battery cells 10 which have the larger SOCs in the foregoing embodiment, the present invention is not limited to this. The SOCs of the plurality of battery cells 10 may be set within the appropriate range by charging the battery cells 10 which have smaller SOCs. In this case, a charger for individually charging each battery cell 10 is provided.

Figure 8:
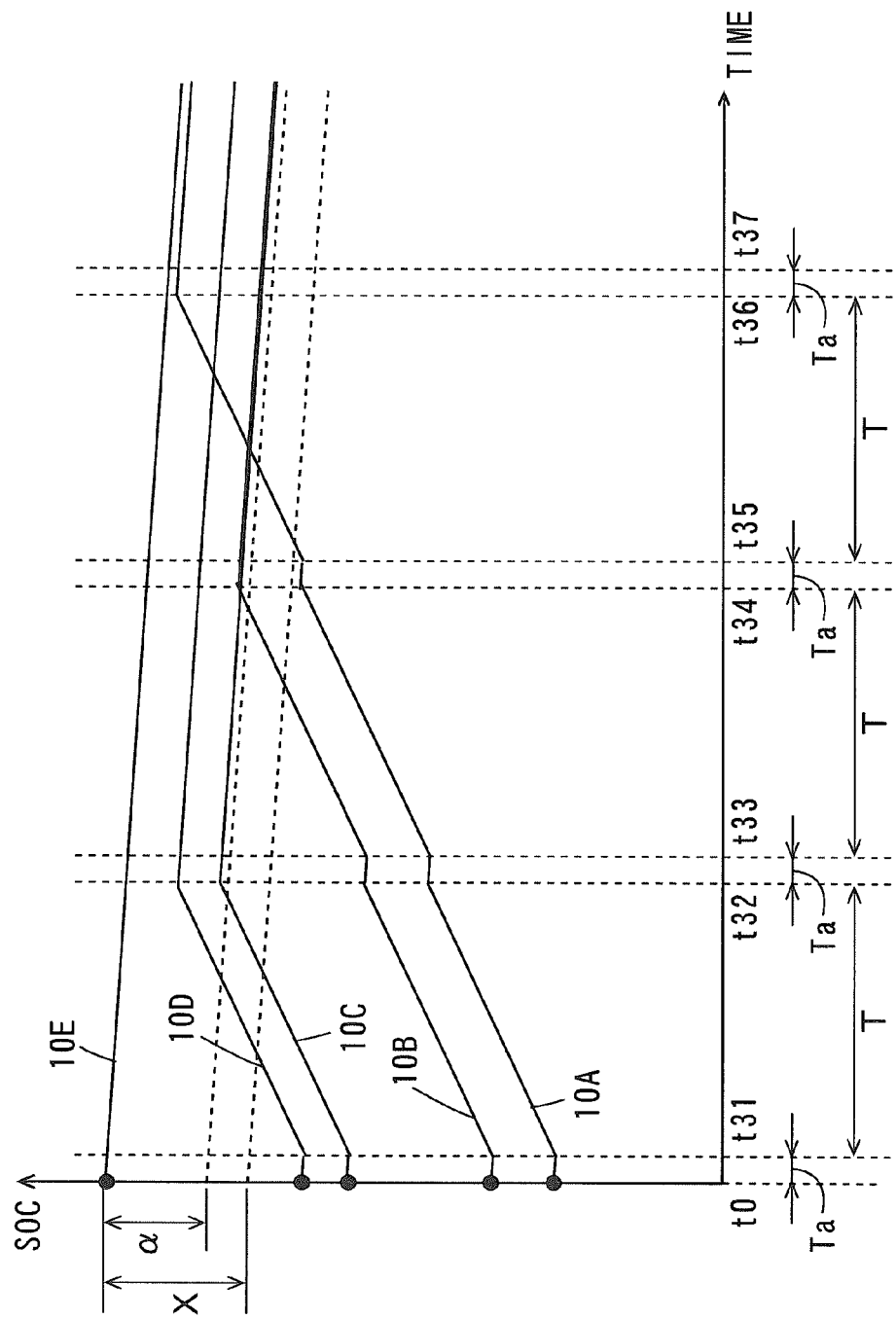
FIG. 8 is a diagram showing change in the SOC of each battery cell when the equalization processing by charge is performed.

FIG. 8 is a diagram showing change in the SOC of each battery cell 10 when the equalization processing by charge is performed. In FIG. 8, the ordinate represents the SOC of each battery cell 10, and the abscissa represents time. FIG. 8 shows changes in the SOCs of the battery cells 10A, 10B, 10C, 10D, 10E. Description is made of the example of FIG. 8 while referring to differences from the example of FIG. 3.

In this example, selected battery cells 10 are periodically charged such that the difference between the maximum SOC (hereinafter referred to as the SOCmax) and the minimum SOC (hereinafter referred to as the SOCmin) of the SOCs of the plurality of battery cells 10 is not more than the prescribed value X that has been set in advance.

More specifically, the SOCs of the battery cells 10 are periodically detected, and the SOCmin and the SOCmax are determined. Then, the battery cells 10, which have the smaller SOCs than a value (SOCmax-$\alpha$) obtained by subtracting the prescribed value $\alpha$ that has been set in advance from the SOCmax, are charged. Meanwhile, the battery cell 10 having the SOC of not less than SOCmax-$\alpha$ is not charged.

The charger for charging each battery cell 10 may be provided as a component of the equalization device 200, and may be provided in the electric vehicle separately from the equalization device 200. Each battery cell 10 may be charged by the charger provided outside the electric vehicle in the equalization processing.

In the example of FIG. 8, the charge of all the battery cells 10A to 10E is stopped at the time point t0. The SOC of the battery cell 10E is the SOCmax, and the SOC of the battery cell 10A is the SOCmin in a period from the time point t0 to a time point t31. The difference between the SOC of the battery cell 10E and the SOC of the battery cell 10A is larger than the prescribed value X. The SOC of each of the battery cells 10A to 10D is smaller than the SOCmax-$\alpha$.

In this case, the charge of the battery cells 10A to 10D is started at the time point t31. This causes the SOC of each of the battery cells 10A to 10D to come close to the SOC (SOCmax) of the battery cell 10E.

Next, the charge of the battery cells 10A to 10D is stopped after an elapse of the preset equalization processing time period T from the time point t31, that is, at a time point t32. The difference between the SOC (SOCmin) of the battery cell 10A and the SOC (SOCmax) of the battery cell 10E is larger than X in a period from the time point t32 to a time point t33. The SOC of each of the battery cells 10A, 10B is smaller than the SOCmax-$\alpha$.

In this case, the charge of the battery cells 10A, 10B is started at the time point t33. Next, the charge of the battery cells 10A, 10B is stopped after an elapse of the preset equalization processing time period T from the time point t33, that is, at a time point t34. In a period from the time point t34 to a time point t35, the difference between the SOC (SOCmin) of the battery cell 10A and the SOC (SOCmax) of the battery cell 10E is larger than X. The SOC of the battery cell 10A is smaller than the SOCmax-$\alpha$.

In this case, the charge of the battery cell 10A is started at the time point t35. Next, the charge of the battery cell 10A is stopped after an elapse of the preset equalization processing time period T from the time point t35, that is, at a time point t36. The difference between the SOCmin (the SOC of the battery cell 10C) and the SOCmax (the SOC of the battery cell 10E) is not more than X in a period from the time point t36 to a time point t37. Accordingly, the equalization processing is finished.

Also in this example, the equalization processing time period T and the prescribed values $\alpha$, X are set such that the equations (2), (5) are satisfied similarly to the foregoing embodiment.

In this case, the equalization processing time period T is set based on the rate of change D1 of the SOC of the battery cell 10 that is charged and the rate of change D2 of the SOC of the battery cell 10 that is not charged such that the battery cell 10 having the SOCmax is not replaced. This allows the SOCs of the plurality of battery cells 10 to be accurately set. Thus, the SOCs of the plurality of battery cells 10 can be efficiently and properly equalized.

The equalization processing time period T is set such that the average current consumption by the battery ECU 101 is smaller than the allowable value $\beta$. This prevents the electric power of the auxiliary battery 110 from being excessively consumed by the battery ECU 101 during the equalization processing. Accordingly, the characteristics of the auxiliary battery 110 can be maintained.

(7-2)

While the full charge capacities of the battery cells 10, the rates of change D1, D2, the processing time period Ta and the current consumption a are detected by the battery ECU 101 in the equalization processing, and the equalization processing time period T and the prescribed values X, $\alpha$ are set based on the detected values in the foregoing embodiments, the present invention is not limited to this.

For example, the full charge capacities of the battery cells 10, the rates of change D1, D2, the processing time period Ta and the current consumption a may be detected, the equalization processing time period T and the prescribed values X, $\alpha$ may be calculated using the detected values such that the equations (2), (5) are satisfied, and the values may be stored in the memory 101b before shipment of the equalization device 200. In this case, the battery ECU 101 does not perform the processes of Steps S1, S2, S9, S14 to S16, and performs the processes of Steps S11 to S13 using the equalization processing time period T and the prescribed values X, $\alpha$ stored in the memory 101b in the equalization processing shown in FIGS. 6 and 7.

(7-3)

While the SOC is used as the charge state of each of the battery cells 10 in the foregoing embodiments, any of the remaining capacity, the open circuit voltage, depth of discharge (DOD), a current integrated value and a difference of an amount of stored charges of each of the battery cells 10 may be used as the charge state instead of the SOC.

The minimum remaining capacity value corresponds to the reference charge state when the remaining capacity is used as the charge state, the minimum voltage value corresponds to the reference charge state when the open circuit voltage is used as the charge state, the maximum DOD value corresponds to the reference charge state when the DOD is used as the charge state, the minimum current integrated value corresponds to the reference charge state when the current integrated value is used as the charge state, and the minimum difference of the amount of stored charges corresponds to the reference charge state when the difference of the amount of stored charges is used as the charge state.

The remaining capacity of the battery cell 10 is obtained by calculating the SOC of each battery cell 10 similarly to the foregoing embodiments, and multiplying the calculated SOC by the full charge capacity that has been measured in advance, for example.

When the remaining capacity is used as the charge state, the equalization processing time period T and the prescribed values $\alpha$, X are set such that a remaining capacity of another battery cell 10 is not smaller than the remaining capacity of the battery cell 10 having the minimum remaining capacity at the time of start of the equalization processing in the equalization processing by discharge (see FIG. 3), and the equalization processing time period T and the prescribed values α, X are set such that a remaining capacity of another battery cell 10 is not larger than the remaining capacity of the battery cell 10 having the maximum remaining capacity at the time of start of the equalization processing in the equalization processing by charge (see FIG. 8).

The open circuit voltage of the battery cell 10 can be detected by the detecting unit 20 similarly to the foregoing embodiments.

When the open circuit voltage is used as the charge state, the equalization processing time period T and the prescribed values α, X are set such that open circuit voltage of another battery cell 10 is not lower than the open circuit voltage of the battery cell 10 having the lowest open circuit voltage at the time of start of the equalization processing in the equalization processing by discharge (see FIG. 3), and the equalization processing time period T and the prescribed values α, X are set such that open circuit voltage of another battery cell 10 is not higher than the open circuit voltage of the battery cell 10 having the highest open circuit voltage at the time of start of the equalization processing in the equalization processing by charge (see FIG. 8).

The depth of discharge is a ratio of a chargeable capacity (a capacity obtained by subtracting the remaining capacity from the full charge capacity of the battery) to the full charge capacity of the battery, and can be represented by (100-SOC) %. The depth of discharge of the battery cell 10 is obtained by calculating the SOC of each battery cell 10 and then subtracting the calculated SOC from 100.

When the depth of discharge is used as the charge state, the equalization processing time period T and the prescribed values α, X are set such that depth of discharge of another battery cell 10 is not larger than the depth of discharge of the battery cell 10 having the maximum depth of discharge at the time of start of the equalization processing in the equalization processing by discharge (see FIG. 3), and the equalization processing time period T and the prescribed values α, X are set such that depth of discharge of another battery cell 10 is not smaller than the depth of discharge of the battery cell 10 having the minimum depth of discharge at the time of start of the equalization processing in the equalization processing by charge (see FIG. 8).

The current integrated value of the battery cell 10 is obtained by detecting a current flowing through each of the plurality of battery cells 10 in a given period during charge or discharge, and integrating detected values, for example. In this case, a current detector for detecting the current flowing through each of the battery cells 10 is provided.

When the current integrated value is used as the charge state, the equalization processing time period T and the prescribed values α, X are set such that a current integrated value of another battery cell 10 is not smaller than the current integrated value of the battery cell 10 having the minimum current integrated value at the time of start of the equalization processing in the equalization processing by discharge (see FIG. 3), and the equalization processing time period T and the prescribed values α, X are set such that a current integrated value of another battery cell 10 is not larger than the current integrated value of the battery cell 10 having the maximum current integrated value at the time of start of the equalization processing in the equalization processing by charge (see FIG. 8).

The difference of the amount of stored charges in the battery cell 10 is obtained by calculating the SOC of each battery cell 10, and then calculating a difference between the calculated SOC and a predetermined reference SOC (SOC 50%, for example).

When the difference of the amount of stored charges is used as the charge state, the equalization processing time period T and the prescribed values α, X are set such that a difference of the amount of stored charges of another battery cell 10 is not smaller than the difference of the amount of stored charges of the battery cell 10 having the minimum difference of the amount of stored charges at the time of start of the equalization processing in the equalization processing by discharge (see FIG. 3), and the equalization processing time period T and the prescribed values α, X are set such that a difference of the amount of stored charges of another battery cell 10 is not larger than the difference of the amount of stored charges of the battery cell 10 having the largest difference of the amount of stored charges at the time of start of the equalization processing in the equalization processing by charge (see FIG. 8).

(7-4)

While a lithium-ion battery is used as the battery cell 10 in the foregoing embodiment, the present invention is not limited to this. For example, another secondary battery such as a nickel metal hydride battery can be also used.

(8) The Electric Vehicle

Description will be made of the electric vehicle including the battery system 500 of FIG. 1. In the following paragraphs, an electric automobile is described as one example of the electric vehicle.

(8-1) Configuration

Figure 9:
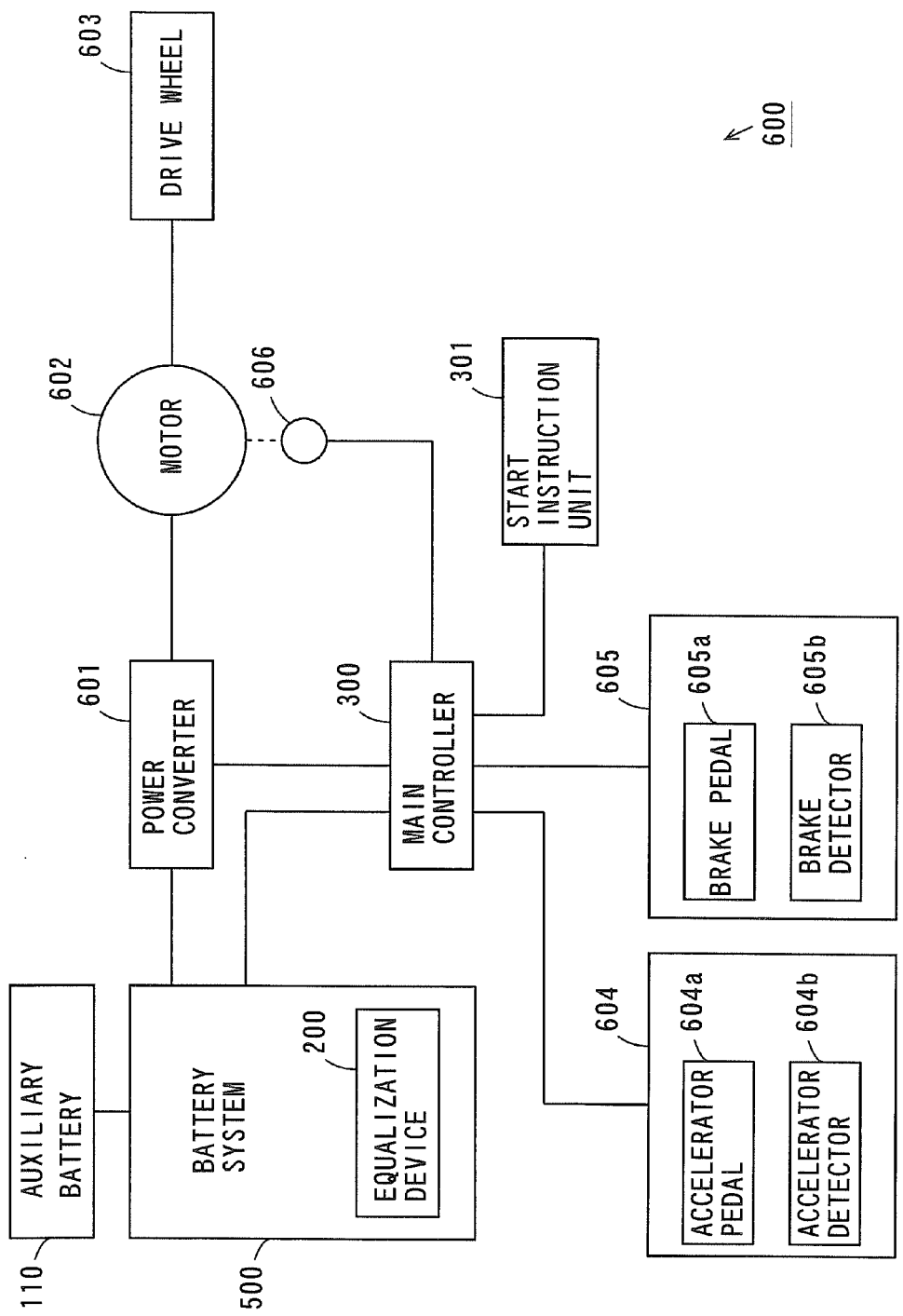
FIG. 9 is a block diagram showing the configuration of an electric automobile.

FIG. 9 is a block diagram showing the configuration of the electric automobile according to a second embodiment. As shown in FIG. 9, the electric automobile 600 according to the present embodiment includes the auxiliary battery 110, the main controller 300, the start instruction unit 301 and the battery system 500 of FIG. 1, a power converter 601, the motor 602, the drive wheel 603, an accelerator system 604, a brake system 605, and a rotational speed sensor 606. When the motor 602 is an alternating current (AC) motor, the power converter 601 includes an inverter circuit. The battery system 500 is provided with the equalization device 200.

As described above, the auxiliary battery 110 is connected to the battery system 500. The battery system 500 is connected to the motor 602 via the power converter 601 while being connected to the main controller 300.

Amounts of charge of the plurality of battery modules 100 (FIG. 1) are applied from the battery ECU 101 (FIG. 1) constituting the battery system 500 to the main controller 300. Each of the accelerator system 604, the brake system 605 and the rotational speed sensor 606 is connected to the main controller 300. In addition, the start instruction unit 301 of FIG. 1 is connected to the main controller 300.

The accelerator system 604 includes an accelerator pedal 604a included in the electric automobile 600 and an accelerator detector 604b that detects an operation amount (depression amount) of the accelerator pedal 604a.

When the accelerator pedal 604a is operated by the user while the start key of the start instruction unit 301 is turned on, the accelerator detector 604b detects the operation amount of the accelerator pedal 604a. Note that a state of the accelerator pedal 604a when not being operated by the user is set as a reference. The detected operation amount of the accelerator pedal 604a is applied to the main controller 300.

The brake system 605 includes a brake pedal 605a included in the electric automobile 600 and a brake detector 605b that detects an operation amount (depression amount) of the brake pedal 605a by the user. When the brake pedal 605a is operated by the user while the start key is turned on, the operation amount is detected by the brake detector 605b. The detected operation amount of the brake pedal 605a is applied to the main controller 300. The rotational speed sensor 606 detects a rotational speed of the motor 602. The detected rotational speed is applied to the main controller 300.

As described above, the amounts of charge of the battery modules 100, the value of the current flowing through the battery modules 100, the operation amount of the accelerator pedal 604a, the operation amount of the brake pedal 605a and the rotational speed of the motor 602 are applied to the main controller 300. The main controller 300 performs charge/discharge control of the battery modules 100 and power conversion control of the power converter 601 based on the information. Electric power generated by the battery modules 100 is supplied from the battery system 500 to the power converter 601 at the time of startup and acceleration of the electric automobile 600 based on the accelerator operation, for example.

Furthermore, with the start key turned on, the main controller 300 calculates a torque (commanded torque) to be transmitted to the drive wheel 603 based on the applied operation amount of the accelerator pedal 604a, and applies a control signal based on the commanded torque to the power converter 601.

The power converter 601 receives the control signal, and then converts the electric power supplied from the battery system 500 into electric power (driving power) required for driving the drive wheel 603. Accordingly, the driving power converted by the power converter 601 is supplied to the motor 602, and the torque of the motor 602 based on the driving power is transmitted to the drive wheel 603.

At the time of deceleration of the electric automobile 600 based on the brake operation, the motor 602 functions as the power generation system. In this case, the power converter 601 converts regenerated electric power generated by the motor 602 to electric power suitable for charging the battery modules 100, and supplies the electric power to the battery modules 100. This causes the battery modules 100 to be charged.

Meanwhile, with the start key turned off, the plurality of battery cells 10 (FIG. 1) are subjected to the equalization processing by the equalization device 200 of the battery system 500.

(8-2) Effects

As described above, the equalization device 200 is provided in the battery system 500 of the electric automobile 600. This allows the SOCs of the plurality of battery cells 10 to be accurately within the appropriate range. Thus, each battery cell can be prevented from being overdischarged or overcharged, and the driving performance of the electric vehicle can be improved.

(9) Correspondences between Elements in the Claims and Parts in Embodiments

In the following paragraph, non-limiting examples of correspondences between various elements recited in the claims below and those described above with respect to various preferred embodiments of the present invention are explained.

In the above-described embodiments, the detecting unit 20 is an example of a detector, the CPU or the microcomputer of the battery ECU 101 is an example of a computer, the battery ECU 101 is an example of a calculator, the memory 101b is an example of a storage, and the discharging unit 40 and the battery ECU 101 is an example of an equalization processing unit. The SOC, the remaining capacity, the voltage, the depth of discharge, the current integrated value and the difference of the amount of stored charges are examples of a charge state. The electric automobile 600 is an example of an electric vehicle.

The equalization device 200 is an example of an equalization device, the battery cell 10 is an example of a battery cell, the battery system 500 is an example of a battery system, the motor 602 is an example of a motor, and the drive wheel 603 is an example of a drive wheel.

The processes of Steps S7, S8 of FIG. 6 are an example of a process of acquiring the charge states of said plurality of battery cells, the processes of Steps S9, S16 of FIGS. 6 and 7 are an example of a process of acquiring an equalization processing time period, the processes of Steps S12, S13, S17 of FIG. 7 are an example of a process of changing the charge state of a second battery cell of said plurality of battery cells.

The processes of Steps S7, S8 of FIG. 6 are an example of a step of detecting the charge states of said plurality of battery cells, the processes of Steps S9, S16 of FIGS. 6 and 7 are an example of a step of acquiring an equalization processing time period, the processes of Steps S12, S13, S17 of FIG. 7 are an example of a step of changing the charge state of a second battery cell of said plurality of battery cells.

As each of various elements recited in the claims, various other elements having configurations or functions described in the claims as well as the components described in the embodiments can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

We claim:

1. An equalization device arranged to perform equalization processing of charge states of a plurality of battery cells including first and second battery cells, comprising:
    a detector arranged to detect the charge states of said plurality of battery cells; and
    an equalization processing unit arranged to change the charge state of said second battery cell of said plurality of battery cells for an equalization processing time period based on the charge states detected by said detector such that the charge state of said second battery cell is close to the charge state of said first battery cell of said plurality of battery cells, wherein
    said equalization processing time period is calculated or set based on a rate of change in the charge state of said first battery cell and a rate of change in the charge state of said second battery cell such that a magnitude relationship between the charge state of said first battery cell and the charge state of said second battery cell is not reversed.

2. The equalization device according to claim 1, further comprising a calculator arranged to calculate the rate of change in the charge state of said first battery cell and the rate of change in the charge state of said second battery cell in said equalization processing based on the charge states detected by said detector and calculate said equalization processing time period based on said calculated rates of change such that the magnitude relationship between the charge state of said first battery cell and the charge state of said second battery cell is not reversed, wherein said equalization processing unit changes the charge state of said second battery cell for said equalization processing time period calculated by said calculator.

3. The equalization device according to claim 1, further comprising a storage arranged to store said equalization processing time period that has been preset, wherein said equalization processing unit changes the charge state of said second battery cell for said equalization processing time period stored in said storage.

4. The equalization device according to claim 1, wherein a prescribed value $\alpha$ is set based on the rate of change in the charge state of said first battery cell and the rate of change in the charge state of said second battery cell in said equalization processing, and said equalization processing unit compares the charge state of said first battery cell and the charge state of said second battery cell, and changes the charge state of said second battery cell for said equalization processing time period when a difference between the charge state of said first battery cell and the charge state of said second battery cell is larger than said prescribed value $\alpha$.

5. The equalization device according to claim 4, wherein said equalization processing is processing of discharging said second battery cell, a battery cell having a reference charge state is detected as said first battery cell, and assuming that D1 represents the rate of change in the charge state of said second battery cell subjected to discharge, D2 represents the rate of change in the charge state of said first battery cell not subjected to discharge, and T represents a time period of said discharge, said equalization processing time period is the time period of said discharge T that is set such that $T \leq \alpha/|D1-D2|$ is satisfied.

6. The equalization device according to claim 1, wherein said equalization processing is processing of discharging said second battery cell, a battery cell having a reference charge state is detected as said first battery cell, and said equalization processing unit includes:

a discharging circuit that can be switched to selectively discharge the plurality of battery cells; and a controller that switches said discharging circuit, said controller proceeds to a non-operating state where said controller does not switch said discharging circuit after an operating state where said controller switches said discharging circuit based on the charge states detected by said detector such that said second battery cell is subjected to discharge and said first battery cell is not subjected to discharge, and assuming that Ta represents a time period of said operating state, a represents current consumption by said controller in said operating state, b represents current consumption by said controller in said non-operating state, and $\beta$ represents a maximum allowable amount of an average amount of current consumption by said controller in said operating state and said non-operating state, said equalization processing time period is a time period of said discharge T that is set such that $Ta \times (a-\beta)/(\beta-b) \leq T$ is satisfied.

7. The equalization device according to claim 1, wherein said charge state is any of a rate of charge, a remaining capacity, voltage, depth of discharge, a current integrated value and a difference of an amount of stored charges.

8. A battery system comprising a plurality of battery cells connected in series and the equalization device according to claim 1.

9. An electric vehicle comprising:
a plurality of battery cells;
the equalization device according to claim 1;
a motor driven by electric power supplied from said plurality of battery cells; and
a drive wheel rotated by a torque generated by said motor.

10. An equalization processing program that is executable by a computer included in an equalization device arranged to perform equalization processing of charge states of a plurality of battery cells including first and second battery cells, causing said computer to execute the processes of:

acquiring the charge states of said plurality of battery cells;
acquiring an equalization processing time period; and
changing the charge state of said second battery cell of said plurality of battery cells for said acquired equalization processing time period based on said acquired charge states such that the charge state of said second battery cell is close to the charge state of said first battery cell of said plurality of battery cells, wherein said equalization processing time period is calculated or set based on a rate of change in the charge state of said first battery cell and a rate of change in the charge state of said second battery cell such that a magnitude relationship between the charge state of said first battery cell and the charge state of said second battery cell is not reversed.

11. An equalization processing method for performing equalization processing of charge states of a plurality of battery cells including first and second battery cells, comprising the steps of:

detecting the charge states of said plurality of battery cells;
acquiring an equalization processing time period; and
changing the charge state of said second battery cell of said plurality of battery cells for said acquired equalization processing time period based on said detected charge states such that the charge state of said second battery cell is close to the charge state of said first battery cell of said plurality of battery cells, wherein said equalization processing time period is calculated or set based on a rate of change in the charge state of said first battery cell and a rate of change in the charge state of said second battery cell such that a magnitude relationship between the charge state of said first battery cell and the charge state of said second battery cell is not reversed.

* * * * *